US012150221B2

(12) United States Patent
Tao et al.

(10) Patent No.: US 12,150,221 B2
(45) Date of Patent: Nov. 19, 2024

(54) METHOD AND SYSTEM FOR SETTING A DRIVING CURRENT OF LUMINAIRES

(71) Applicant: SIGNIFY HOLDING B.V., Eindhoven (NL)

(72) Inventors: Haimin Tao, Eindhoven (NL); Werner Friedrich Horikx, Eindhoven (NL); Matthias Wendt, Wuerselen (DE); Martinus Petrus Creusen, Wijlre (NL); Bernd Ackermann, Aachen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/926,249

(22) PCT Filed: May 26, 2021

(86) PCT No.: PCT/EP2021/064032
§ 371 (c)(1),
(2) Date: Nov. 18, 2022

(87) PCT Pub. No.: WO2021/244916
PCT Pub. Date: Dec. 9, 2021

(65) Prior Publication Data
US 2023/0217565 A1    Jul. 6, 2023

(30) Foreign Application Priority Data
Jun. 2, 2020   (EP) .................................. 20177844

(51) Int. Cl.
H05B 45/30   (2020.01)
H05B 45/14   (2020.01)
(Continued)

(52) U.S. Cl.
CPC ........... *H05B 45/345* (2020.01); *H05B 45/14* (2020.01); *H05B 45/34* (2020.01); *H05B 45/56* (2020.01)

(58) Field of Classification Search
CPC ........ H05B 45/14; H05B 45/34; H05B 45/56; H05B 45/60; H05B 45/345; H05B 45/375; H05B 45/3725
See application file for complete search history.

(56) References Cited

U.S. PATENT DOCUMENTS

2012/0074846 A1*  3/2012  Marreiro ................. H05B 47/24
                                                    315/121
2014/0035474 A1*  2/2014  Kuo ....................... H05B 45/14
                                                    315/200 R
(Continued)

FOREIGN PATENT DOCUMENTS

WO    2015000863 A1    1/2015
WO    2019059767 A1    3/2019

*Primary Examiner* — Tung X Le

(57) ABSTRACT

The invention relates to an incorporation of a current limiting/regulating circuit on a luminaire board for ensuring that the luminaire board will automatically operate at its desired current after a replacement. Since the current control at the luminaire board causes an initial mismatch between the current supply of the driver and the demand of the luminaire board, the driver output voltage will drift towards the maximum output voltage of the driver. When the maximum output voltage is reached, the driver is configured to operate in constant-voltage (CV) mode, sense the output current and reduce its output current to the same value as consumed by current-controlled luminaire board. Alternatively, the driver may gradually reduce the setpoint of the output current until it just leaves the CV mode and stay at that setpoint. In this way, the driver will automatically operate at the correct current of a newly installed luminaire board without any action from the user.

8 Claims, 5 Drawing Sheets

(51) Int. Cl.
    *H05B 45/34*     (2020.01)
    *H05B 45/345*     (2020.01)
    *H05B 45/56*     (2020.01)

(56) References Cited

U.S. PATENT DOCUMENTS

| | | | |
|---|---|---|---|
| 2014/0159598 A1* | 6/2014 | Boezen | H05B 45/14 |
| | | | 315/307 |
| 2016/0212807 A1 | 7/2016 | Eberson et al. | |
| 2018/0249544 A1* | 8/2018 | Hagelaar | H05B 45/58 |
| 2018/0293946 A1* | 10/2018 | Li | G09G 3/3406 |
| 2018/0338364 A1* | 11/2018 | Ido | H05B 45/10 |
| 2019/0141802 A1* | 5/2019 | Saes | H05B 45/3725 |
| 2020/0323057 A1* | 10/2020 | Adams | H05B 47/185 |

* cited by examiner

METHOD AND SYSTEM FOR SETTING A DRIVING CURRENT OF LUMINAIRES

CROSS-REFERENCE TO PRIOR APPLICATIONS

This application is the U.S. National Phase application under 35 U.S.C. § 371 of International Application No. PCT/EP2021/064032, filed on May 26, 2021, which claims the benefit of European Patent Application No. 20177844.6, filed on Jun. 2, 2020. These applications are hereby incorporated by reference herein.

FIELD OF THE INVENTION

The invention relates to the field of lighting systems, such as—but not limited to—solid-state lighting systems, for use in various different applications for home, office, retail, hospitality and industry.

BACKGROUND OF THE INVENTION

Throughout the following disclosure, a luminaire is to be understood as any type of lighting unit or lighting fixture which comprises one or more light sources (including visible or non-visible (infrared (IR) or ultraviolet (UV)) light sources) for illumination and/or communication purposes and optionally other internal and/or external parts necessary for proper operation of the lighting, e.g., to distribute the light, to position and protect the light sources and ballast (where applicable), and to connect the luminaires to a power supply. Luminaires can be of the traditional type, such as a recessed or surface-mounted incandescent, fluorescent or other electric-discharge luminaires. Luminaires can also be of the non-traditional type, such as fiber optics with a light source and a fiber core or "light pipe" for guiding light generated by the light source.

To reduce waste and enable a circular economy, future luminaires need to be made serviceable. During service or upgrade actions luminaire modules (e.g. LED modules also called "L2 (Level 2) boards" or the like) may often need to be exchanged. Such luminaire modules may be used as carriers for light source(s) (e.g. LED(s)) and may be manufactured as printed circuit boards (PCBs) either from typical PCB materials like FR4, flex-on-rigid or on MCPCB (Metal core PCB) carriers for enhanced cooling. After years of service, old parts may already be obsolete and not available anymore. When a broken luminaire module is replaced by a more efficient one, the current through the light source(s) needs to be adjusted. However, an existing luminaire driver (e.g. current driver for the light source(s)) does not have knowledge of the new luminaire module and will keep supplying the light source(s) with the same current.

Thus, a major issue when it comes to exchanging luminaire modules is that the new combination of luminaire driver and luminaire board should be plug-and-play capable and functioning properly, without any action from a user.

Typically, the light output of a luminaire module depends on the driving current (set by the driver) and the efficacy level of the luminaire module. In case of exchanging an existing luminaire module with an improved or new one (e.g. higher efficacy), the driving current should be adapted to ensure that the same light output is generated as with the original module.

In conventional lighting systems, the luminaire driver does not change the driving current when a luminaire module is replaced and reprogramming of the luminaire driver by a user would be too complex, since it requires specific tools and/or knowledge. As a result, introduction of a luminaire module with higher efficacy will generate a light output that may be too high.

SUMMARY OF THE INVENTION

It is an object of the present invention to provide improved serviceability for lighting systems when luminaire modules are replaced.

According to a first aspect, a luminaire module comprises:
at least one light source; and
a current limiter for controlling a current flowing through the at least one light source to a predetermined value;
wherein the luminaire module is configured to be connectable to an external constant current driver.

Accordingly, a current limiting/regulating function is incorporated in luminaire modules such that a new luminaire module will automatically operate at its desired current after the exchange given that the output voltage of the driver is sufficient to reach that current. Thereby, external drivers and luminaire modules can be automatically matched in a cost-effective way.

According to a first option of the first aspect, the current limiter may be configured to control the current flowing through the at least one light source to a set target value of the luminaire module independent from a current source of the external driver. Thus, the current limiter of the luminaire module ensures a proper target value of the current through the light source(s) of the luminaire module irrespective of the setpoint of the external driver.

According to a second option of the first aspect, which may be combined with the first option, the luminaire module may comprise a temperature sensing element or functionality for measuring a temperature of the current limiter, wherein the luminaire module may be configured to activate a switch that shunts the output of the external driver or bypasses the current limiter if a predetermined overtemperature is measured by the temperature sensing element or functionality. Thereby, it can be ensured that the current limiter is protected from overtemperature by an excessive voltage which may be generated by a non-matched external driver.

According to a third option of the first aspect, which may be combined with the first or second option, the luminaire module may comprise a temperature sensing element or functionality for measuring a temperature of the current limiter, wherein the current limiter may be configured to increase a setpoint for the current regulation or bypass a current sensing element if a predetermined overtemperature is measured by the temperature sensing element or functionality. Thereby, it can be ensured that the current limiter is protected from overtemperature by an excessive voltage which may be generated by a non-matched external driver without deactivating the luminaire module or the current limiter.

According to a fourth option, which may be combined with any one of the first to third options, the luminaire module may comprise a voltage sensing element or functionality for measuring a voltage across the current limiter, wherein the luminaire module is configured to activate a switch to bypass the current limiter when the measured voltage exceeds a predetermined threshold voltage. Thereby, it can be ensured that the current limiter is protected from overtemperature by an excessive voltage which may be generated by a non-matched external driver.

According to a fifth option of the first aspect, which may be combined with any one of the first to fourth options, the current limiter may comprise a linear current regulating circuit or a current regulating diode. Thereby, the current limiting function can be implemented without substantially increasing circuit complexity of the luminaire module.

According to a second aspect (which is directed to the driver side), an apparatus for controlling a driver that can be connected to an external luminaire module of a lighting system is provided, wherein the apparatus is configured to measure an output voltage of the driver applied to a connected luminaire module, to determine whether the measured output voltage exceeds an operating range of a current control mode of the driver, and to reduce the output current of the driver if the measured output voltage exceeds the operating range (i.e., reaches an upper operating limit). Preferably, the reducing of the output current of the driver is done such that the output current remains larger than zero. It is not the purpose of the invention to stop providing current such as in an overvoltage protection but to lower the output current to an other non-zero current value.

Thereby, in addition to the above advantages, the current limiter of the luminaire module can be protected from overtemperature and/or excessive voltage caused by the increased output voltage of the driver when it leaves the current control mode.

According to a first option of the second aspect, which can be combined with any of the first to fifth options of the first aspect, the apparatus may be configured to measure the output current of the driver and to reduce the output current to the same value as consumed by the luminaire module if the measured output voltage exceeds the operating range. This measure ensures that the output voltage of the driver is kept within the operating range of the current control mode.

According to a second option of the second aspect, which can be combined with the first option of the second aspect or any of the first to fifth options of the first aspect, the apparatus may be configured to gradually reduce the setpoint of the output current until the driver returns to the operating range of the current control mode if the measured output voltage exceeds the operating range. This alternative measure also ensures that the output voltage of the driver is kept within the operating range of the current control mode.

According to a third option of the second aspect, which can be combined with the first or second option of the second aspect or any of the first to fifth options of the first aspect, the apparatus may be configured to control the driver to generate a pulsed output current, wherein a maximum value of the pulsed output current is equal to or larger than an operating range of the current control mode, and to determine a presence of a non-matching luminaire module if the output voltage of the driver comprises a pulsed component. Thereby, the proposed voltage measurement can be used to detect non-matches luminaire devices, e.g., by a blinking light emitted by the light sources of the luminaire module.

According to a third aspect, a driver is provided, that comprises an apparatus according to the second aspect.

According to a first option of the third aspect, which can be combined with any of the first to third option of the second aspect or any of the first to fifth option of the first aspect, the driver may be configured to output a constant current during the current control mode (i.e. CC mode) and to switch to a voltage controlled mode (i.e. CV mode) where the driver outputs a constant voltage when the output voltage exceeds the operating range of the current control mode.

Thereby, the output voltage of the driver can be used to detect whether a non-matched luminaire module is connected to the driver.

According to a fourth aspect, a lighting system is provided, that comprises at least one driver according to the third aspect and at least one luminaire module according to the first aspect.

According to a fifth aspect, a method of controlling a driver in a lighting system is provided, wherein the method comprises:
measuring an output voltage of the driver applied to a connected luminaire module;
determining whether the measured output voltage exceeds an operating range of a current control mode of the driver; and
reducing the output current of the driver if the measured output voltage exceeds the operating range.

According to a sixth aspect, a computer program product is provided, which comprises code means for producing the steps of the above method of the fifth aspect when run on a computer device.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Various embodiments of the present invention are now described based on luminaires of a solid-state lighting system. Solid-state lighting (SSL) is a type of lighting that uses semiconductor light-emitting diodes (LEDs), semiconductor lasers, vertical-cavity surface emitting lasers (VCSELs), organic light-emitting diodes (OLED), or polymer light-emitting diodes (PLED) as sources of illumination or light sources rather than electrical filaments, plasma (used in arc lamps such as fluorescent lamps), or gas. Furthermore, solid-state electroluminescence may be used in SSL as opposed to incandescent bulbs (which use thermal radiation) or fluorescent tubes. Compared to incandescent lighting, SSL creates visible light with reduced heat generation and less energy dissipation. Moreover, white LEDs may convert blue light from a solid-state device to an (approximate) white light spectrum using photoluminescence, the same principle as used in conventional fluorescent tubes.

The following embodiments are directed to LED luminaires. They can be implemented in connection with easy-serviceable L2 (level 2) boards and are applicable to any kind of separate LED drivers which are designed for easy serviceability of luminaires. It is however mentioned that the present invention can be used for any kind of luminaires to enhance their serviceability.

A driver is an electrical device that regulates the power to an LED or string(s) of LEDs. The driver may respond to changing needs of the LED by supplying a constant amount of power to the LED as its electrical properties change with the temperature. The driver is important because LEDs require very specific electrical power in order to operate properly. If the voltage supplied to the LED is lower than required, very little current runs through the junction, resulting in low light and poor performance. On the other hand, if the voltage is too great, too much current flows to the LED and it can overheat and be severely damaged or fail completely (thermal runaway). This certainly applies to other kinds of luminaires as well.

Figure 1:
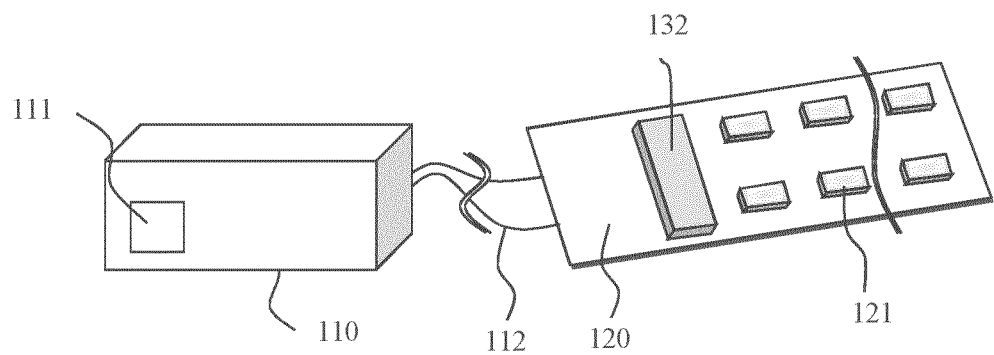
FIG. 1 shows schematically a block diagram of a luminaire system with a driver and an enhanced luminaire module according to various embodiments.

FIG. 1 shows schematically a block diagram of a luminaire system with a driver 110 and an enhanced luminaire module 120 (e.g. a level two (L2) board or the like) according to various embodiments.

It is noted that—throughout the present disclosure—the structure and/or function of blocks or circuit components with identical reference numbers that have been described before are not described again, unless an additional specific functionality is involved. Moreover, only those structural elements and functions are shown, which are useful to understand the embodiments. Other structural elements and functions are omitted for brevity reasons.

In the exemplary embodiment of FIG. 1, the driver 110 is connected to the luminaire module 120 via two connection lines or wires 112. The luminaire module holds a plurality of solid-state light sources (e.g. LEDs) 121 and in addition a current limiter 132 for controlling and limiting the current through the light sources 121. The current limiter 132 may be a linear current regulating circuit (which is available at low cost and small size), for example, a current regulating diode (CRD). It may be implemented as an integrated circuit (chip or chip module as shown in FIG. 1) or a circuit of discrete circuit elements.

Furthermore, the driver 110 may comprise a user interface and/or input port 111 for setting driver parameters for and/or supplying power to the driver 110.

The current limiter 132 is provided on the luminaire module 120 such that the current through the light sources 121 of the luminaire module 120 can be controlled by the luminaire module 120 itself, though the driver 110 operates as a current source as well. Furthermore, some extra functionalities and/or elements may be introduced at the driver 110 to minimize the loss on the luminaire module, as explained later.

Since the additional current control by the current limiter 132 of the luminaire module 120 may cause an initial mismatch between the current supply and demand at the driver 110, the driver output voltage may drift towards a maximum allowable output voltage of the driver 110. This presumes that the constant current setting at the driver 110 is higher than the current consumed by the connected luminaire module 120, which is reasonable as a new luminaire module will most probably carry light sources of better efficacy.

Separately arranged drivers are typically designed to output a constant current (CC) and in case of open load or too high load voltage (e.g. LED string voltage), it maintains a constant voltage (CV). Such drivers are commonly referred to as CCCV drivers.

Figure 2:
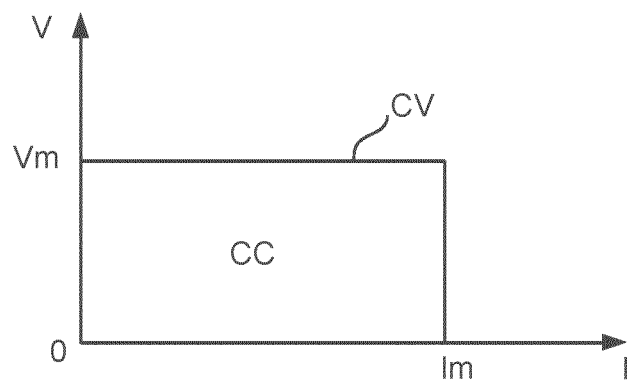
FIG. 2 shows schematically an output characteristic of a driver with constant-voltage (CV) mode.

FIG. 2 shows schematically an output characteristic of a CCCV driver with constant-voltage (CV) mode. In the diagram, the vertical axis corresponds to the driver output voltage V while the horizontal axis corresponds to the driver output current I.

A CCCV driver with such a characteristic normally operates in the CC mode if the voltage V and current I operating point of the load (e.g. luminaire module) falls within the operating window of FIG. 2, which is determined by a maximum output voltage Vm and a maximum output current Im of the driver. The load current can be set through the control interface 111 via a dimming tool or via a configuration tool of the driver 110, and the resulting voltage is determined by the LED load. Usually, this voltage falls within the limit Vm. When the load voltage V becomes too high (e.g., too many light sources (e.g. LEDs) in series) and exceeds the maximum output voltage Vm, the driver will exit the CC mode window and try to maintain a constant output voltage in the CV mode where the current I is not regulated anymore, which means that the current I is then determined by the load.

Some drivers may also have a so-called constant power (CP) mode, which is constrained by the throughput power capability of the driver.

Figure 3:
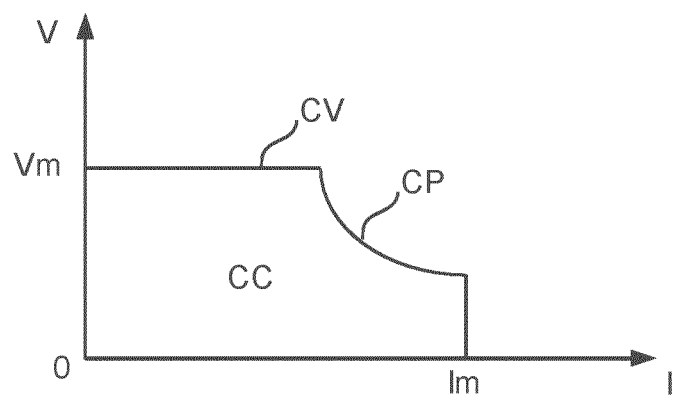
FIG. 3 shows schematically an output characteristic of a driver with CV mode and constant-power (CP) mode.

FIG. 3 shows schematically an output characteristic of a CCCV driver with CV mode and constant-power (CP) mode. As can be gathered from the characteristic of FIG. 3, the operating window of the driver is not only confined by the maximum output voltage Vm and the maximum output current Im, but also by a maximum output power (i.e. maximum product of output voltage V times output current I). This additional confinement by the maximum output power leads to the effect that a right upper portion of the operating window (where output voltage and output current is high) is cut off.

In the example of a 40 W indoor driver, the output voltage V may be limited to a maximum value Vm=54V and the load current I can be set up to a maximum value Im=1.1 A. However, at the maximum output current Im of 1.1 A the maximum allowed output voltage is reduced to about 36V due to a maximum power limit of 40 W.

However, when the luminaire module 120 has its own current limiter and this current is less than the current produced by the driver 110, a voltage difference between the maximum output voltage Vm of the driver 110 and the voltage Vs across the light sources 121 (e.g. string of LEDs) is generated across the current limiter 132 and causes energy dissipation as heat. If Vs is close to Vm, this might be acceptable. But if the voltage difference is too high, the resultant energy dissipation may be too high for the current limiter 132 and/or the power loss may be undesirable.

To address this power loss problem, additional measures are proposed for the driver 110, as explained in the following examples.

The driver 110 of FIG. 1 is configured to switch to the CV mode when the maximum allowable output voltage Vm of the driver 110 has been reached. As additional measure, the driver 110 may be configured to sense the output current and reduce its output current to the same value as consumed by the luminaire module 120. Alternatively, after any repair or after each power-up, the driver 110 may gradually reduce the setpoint of its output current until it just leaves the CV mode and may then stay at that setpoint. This newly determined setpoint may be stored in a non-volatile memory inside the driver and directly used after next power-up, such that the system does not need to go through this procedure after each power-up. This may be beneficial for the lifetime of the components.

In these ways, the driver 110 will automatically operate at the correct current of a new luminaire module 120 without any action from the user.

Figure 4:
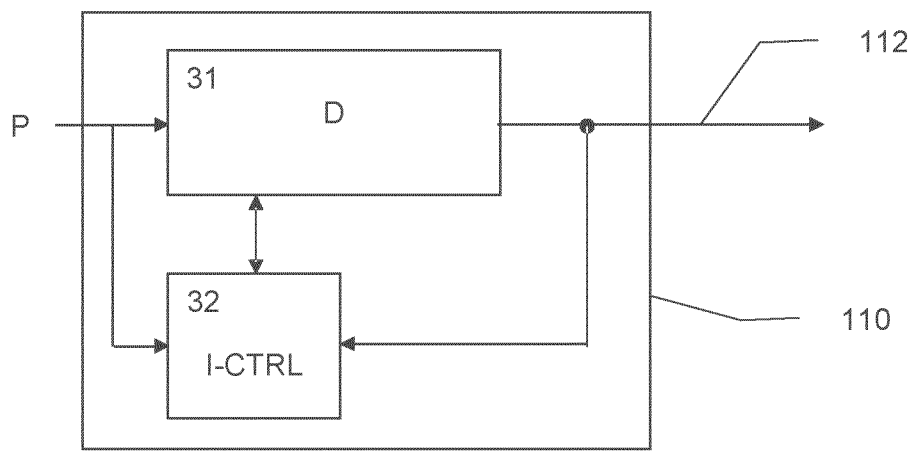
FIG. 4 shows schematically a block diagram of a driver according to various embodiments.

FIG. 4 shows schematically a block diagram of the driver 110 according to various embodiments.

The driver 110 comprises a driver circuit (D) 31 for generating a drive current to be supplied to the luminaire module 120 in order to activate and drive the light sources 121. The driver circuit 31 is configured as a controllable current source for providing sufficient current to light the light sources 121 of the luminaire module 120 at the required brightness, but to limit the current to prevent damaging the light sources 121.

Furthermore, the driver 110 comprises a current control circuit (I-CTRL) 32 which is connected to the output of the driver 110 and is configured (e.g. programmed) to measure the output voltage and to control the driver circuit 31 so as to switch to the CV mode when it has detected that the maximum allowable output voltage Vm of the driver 110 has been reached.

Then, the current control circuit 32 measures the output current of the driver 110 and controls the driver circuit 31 to reduce the output current of the driver 110 to the same value as consumed by the luminaire module 120, i.e., the value of the measured output current.

Alternatively, after switching to the CV mode, the current control circuit 32 of the driver 110 may control the driver circuit 31 to gradually reduce the setpoint of its output current until the driver circuit 31 just leaves the CV mode to return to the CC mode. Then, the current control circuit 32 controls the driver circuit 31 to maintain this setpoint.

Both driver circuit 31 and current circuit 32 receive their power supply P from a power supply circuit (not shown) internal or external to the driver 110.

The interface control circuit 32 may be implemented as a programmable processor controlled by a software routine stored in a program memory.

Figure 5:
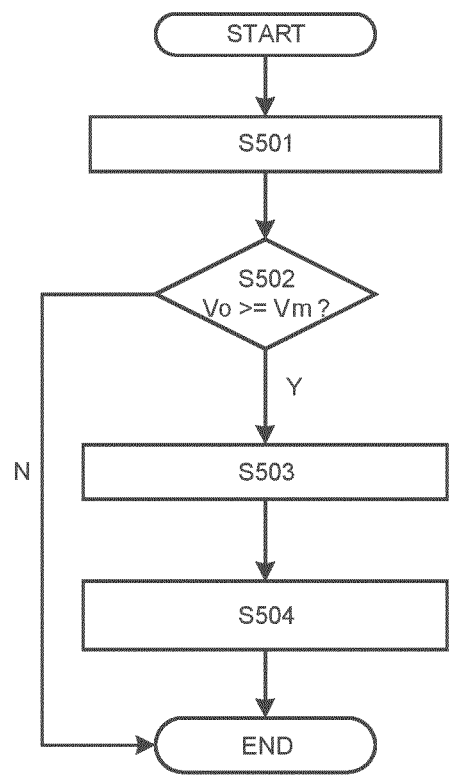
FIG. 5 shows a flow diagram of an enhanced luminaire driving procedure according to an embodiment.

FIG. 5 shows a flow diagram of an enhanced luminaire driving procedure according to an embodiment.

This procedure may be implemented in the driver 110, e.g., by a software routine controlling the current control circuit 32.

In step S501, the output voltage Vo of the driver 110 is measured. This can be achieved by supplying the output voltage of the driver 110 e.g. directly or via a voltage divider to an analog-to-digital converter (ADC) and storing the converted digital measurement value in a memory.

Then, in step S502, the measured voltage value of the output voltage Vo is compared to the maximum output voltage Vm which may be stored in a memory as well.

If it is detected in step S502 that the measured value of the output voltage Vo is smaller than the maximum output value Vm (branch "N" for "no" in FIG. 5), which indicates a CC mode of operation, the procedure ends, since the output current demanded by the new luminaire module 120 matches the current supplied by the driver 110.

Otherwise, if it is detected that the measured value of the output voltage Vo is greater than or equal to the maximum output value Vm (branch "Y" for "yes" in FIG. 5), which indicates a CV mode of operation, the procedure continues with step S503 and the output current Io of the driver, which is now determined by the luminaire module 120, is measured. This can be achieved e.g. by letting the output current flow through a small shunt resistor or other current detecting element to obtain a measurement voltage and supplying the obtained measurement voltage directly or via a voltage divider to an analog-to-digital converter (ADC) and storing the converted digital measurement value that corresponds to the measured value of the output current Io in a memory. As another option, the output current amplitude may already be available inside the driver 110.

Then, in step S504, the driver output current is set to and maintained at the measured value of the output current Io. Optionally, the driver 110 may (gradually) reduce its output current to the measurement value as consumed by the (new) luminaire module.

The local current limiter 132 on the luminaire module may eventually saturate during the control procedure at the driver 110, which may lead to a near short circuit and thus a neglectable power loss (i.e. the voltage drop across the current limiter 132 may become near zero volt). In this way, a new operating point can be automatically established between the driver 110 and the a new (more efficient) luminaire module 120.

Figure 6:
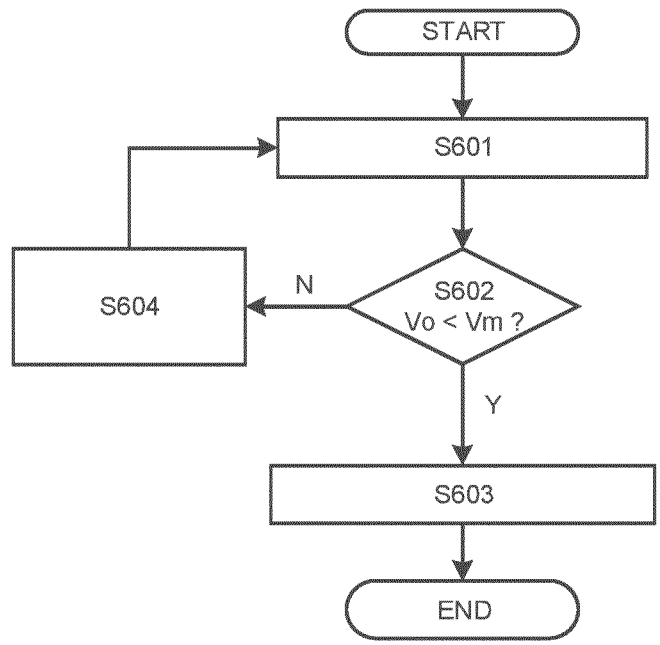
FIG. 6 shows a flow diagram of an enhanced luminaire driving procedure according to an alternative embodiment.

FIG. 6 shows a flow diagram of an enhanced luminaire driving procedure according to an alternative embodiment.

In the alternative luminaire driving procedure of FIG. 6, the output voltage Vo of the driver 110 is measured in step S601, as in step S501 of FIG. 5.

Then, in step S602, the measured voltage value of the output voltage Vo is also compared to the maximum output voltage Vm, as in step S502 of FIG. 5.

Now, if it is detected in step S602 that the measured value of the output voltage Vo is smaller than the maximum output value Vm (branch "Y" for "yes" in FIG. 6), which indicates a CC mode of operation, the procedure continues with step S603 where the output current of the driver 110 is maintained ("freezed"), since it is within the operating window of the driver 110.

Otherwise, if it is detected that the measured value of the output voltage Vo is greater than or equal to the maximum output value Vm (branch "N" for "no" in FIG. 6), which indicates a CV mode of operation, the procedure branches to step S604 and the driver 110 gradually reduces the setpoint of the output current by a small step. Then, the procedure jumps back to step S601 and the output voltage Vo is measured again and then compared to the maximum output voltage Vm.

This loop of steps S601, S602 and S604 is continued until it is determined in step S602 that the driver 110 has left the CV mode and the procedure continues with step S603 so that the driver 110 stays at that setpoint.

Thus, in the alternative luminaire driving procedure of FIG. 6, the driver 110 will automatically operate at the correct current of a new luminaire module 120 without sensing the output current.

The above features of the procedures (FIG. 5 and FIG. 6) can be implemented with software procedures controlling a processor or with analog control circuit in a feedback loop of the driver 110.

In the following, examples for implementing an enhanced luminaire module 120 with the proposed current limiter 132 are explained with reference to FIGS. 7 to 12.

Figure 7:
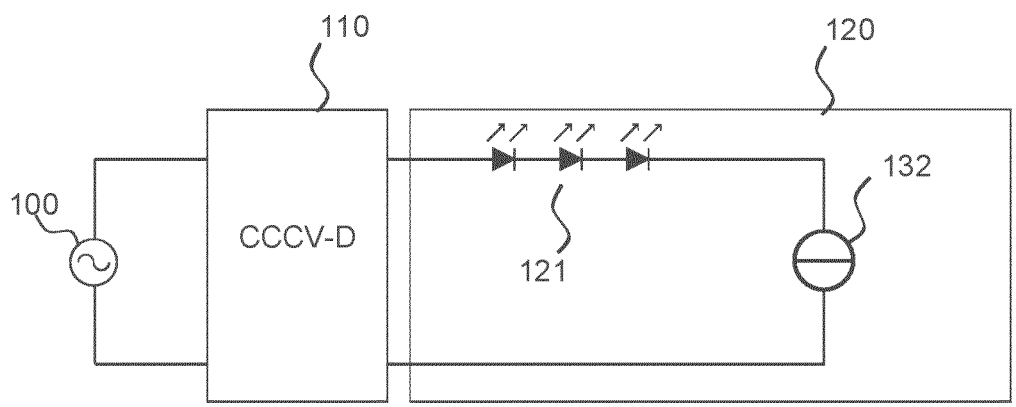
FIG. 7 shows schematically a block diagram of a first example of an enhanced luminaire module according to an embodiment.

FIG. 7 shows schematically a block diagram of a first example of the enhanced luminaire module 120 according to an embodiment.

A CCCV driver 110 powered by an AC power source 100 is connected to an enhanced luminaire module 120 which comprises a current limiter 132. The current limiter 132 is connected in series with a chain or string of LEDs 121 to thereby allow driving a more efficient luminaire module 120 without replacing an existing driver 110 that outputs a higher current than desired by the new luminaire module 120.

The local current limiter 132 is configured to control the current through the LEDs 121 to a set target value (which is lower than the output current of the driver 110). As a result, the output voltage of the driver 110 increases due to the surplus of current and this surplus current charges a driver internal output filter capacitor and soon the output voltage will reach the maximum output voltage Vm, so that the driver 110 enters the CV mode. As the current through the LEDs 121 is controlled by the local current limiter 132, the new (more efficient) luminaire module 120 can operate at its desired current.

The current limiter 132 can be implemented by a commonly used current regulator circuit (e.g. constant current source).

Figure 8:
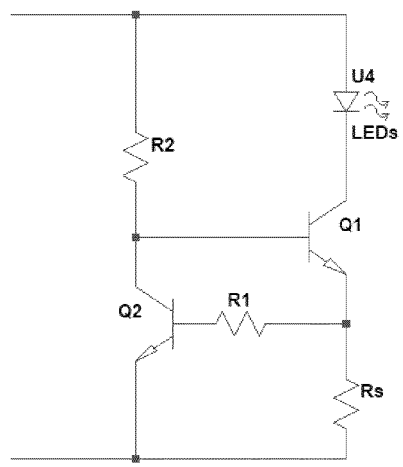
FIG. 8 shows schematically an example of a linear current regulator circuit that can be used in various embodiments.

FIG. 8 shows schematically an example of a linear current regulator circuit that can be used as the current limiter 132 in various embodiments.

A first transistor Q1 is configured as a power transistor that controls the current through at least one LED U4 connected in series with and to the collector electrode of the first transistor Q1. Furthermore, a second transistor Q2 with a collector resistor R2 (which provides a base current to Q1) provides a feedback signal to the base electrode of the first transistor Q1 based on a voltage generated at a current sensing resistor Rs. The controlled current that flows through the series connection of the LED(s) U4, the first transistor Q1 and the current sensing resistor Rs is determined by Vbe/Rs, where Vbe is the base-emitter voltage of the second bipolar transistor Q2, assuming that the voltage at the base resistor R1 of the second transistor Q2 can be neglected due to the small base current.

Thus, in the linear current regulator circuit of FIG. 8, the current through the LEDs U4 is regulated by the first transistor Q1 due to the feedback loop via the second transistor Q2 to a set value Io=Vbe/Rs. When the current Io tries to increase from this set value, the base-emitter voltage at the second transistor Q2 increases so that the collector-emitter voltage of the second transistor Q2 decreases. Thereby, the base current of the first transistor Q1 decreases and the current through the LEDs U4 decreases again to its set value. When the current Io tries to decrease from this set value, the base-emitter voltage at the second transistor Q2 decreases so that the collector-emitter voltage of the second transistor Q2 increases. Thereby, the base current of the first transistor Q1 increases and the current through the LEDs U4 increases again to its set value.

Of course, other available current regulator elements, circuits or integrated circuits (ICs) may be used as the proposed current limiter 132. As an example, an easy-to-use device that can be used as the proposed current limiter 132 is the so-called current regulating diode (CRD) or constant-current diode, which provides a fixed current and has only two terminals.

The following second to fourth examples address the problem that the current regulator 132 can be thermally overloaded by an excessive voltage when the luminaire module 120 is connected to a driver 110 that is not smart, e.g., has no current control functionality as described in connection with FIGS. 5 and 6.

Figure 9:
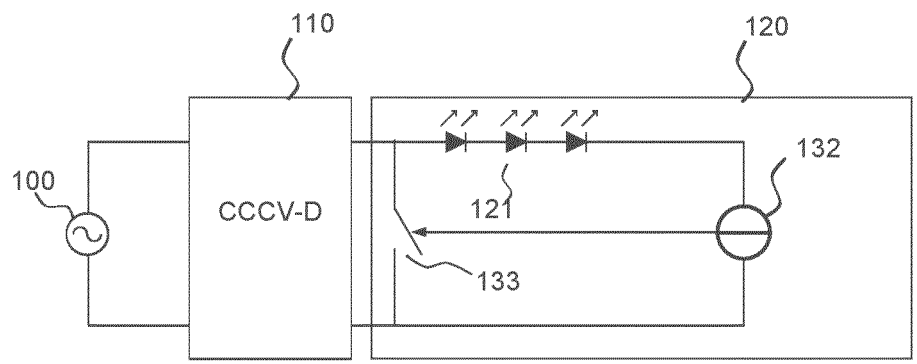
FIG. 9 shows schematically a block diagram of a second example of an enhanced luminaire module according to an embodiment.

FIG. 9 shows schematically a block diagram of the second example of the enhanced luminaire module 120 according to an embodiment.

In the second example, it is proposed to provide the luminaire module 120 with an enhanced current limiter 132 that can protect itself against thermal overload. This can be achieved by providing the current limiter 132 with an integrated or external temperature sensing element or functionality (not shown in FIG. 9) that is configured to measure the temperature of the current limiter 132 and, if it detects a predetermined overtemperature, the current limiter 132 activates a switch 133 that shunts (e.g. (nearly) short circuits by a low resistance value) the output of the driver 132. Thereby, the string of LEDs 121 and the current limiter 132 of luminaire module 120 are switched off in case of a thermal overload.

Figure 10:
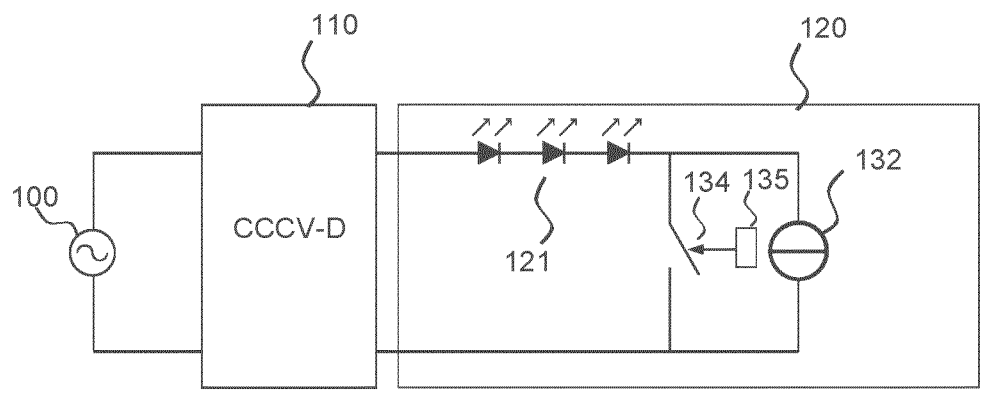
FIG. 10 shows schematically a block diagram of a third example of an enhanced luminaire module according to an embodiment.

FIG. 10 shows schematically a block diagram of the third example of the enhanced luminaire module 120 according to an embodiment.

Alternatively, the current limiter 132 can shunt itself when an overtemperature is detected. This can be achieved by providing a temperature sensing element 135 internal or external to the current limiter 132 that is configured to measure the temperature of the current limiter 132 and, if it detects a predetermined overtemperature, to activate a switch 134 that bypasses (e.g. (nearly) short circuits by a low resistance value) the current limiter 132. Thereby, the LEDs 121 may experience a higher current than the current limiter 132 is supposed to guarantee. This problem will be addressed in the fifth example shown in FIG. 12. The additional bypass switch 134 is not always necessary. The current limiter 132 may increase the setpoint (target value) for the current regulation or bypass a current sensing element (e.g. resistor Rs in FIG. 5). As a result, more current is allowed to pass through the current limiter and the voltage across the current limiter 132 will decrease, leading to a lower power loss.

The effect of the temperature protection control of the luminaire module 120 in the second and third examples may result in a blinking of the string of LEDs 121 which in turn warns a user or service person that the driver 110 in use is not appropriate for that luminaire module 120 and also needs to be replaced.

Figure 11:
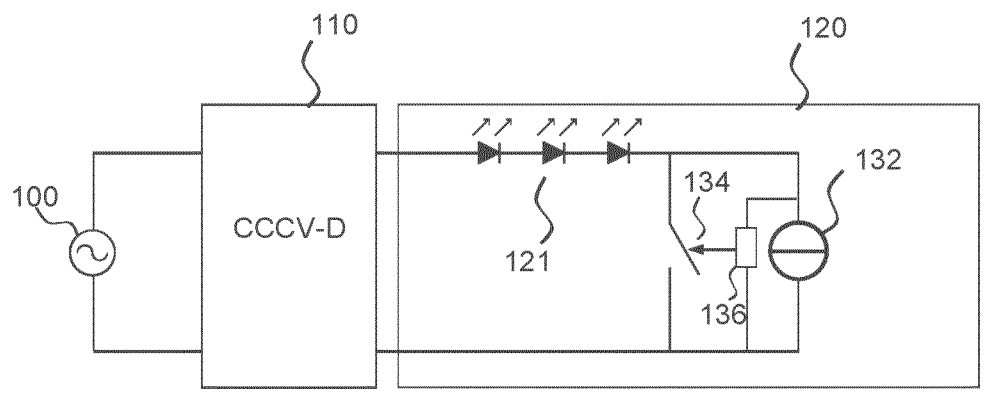
FIG. 11 shows schematically a block diagram of a fourth example of an enhanced luminaire module according to an embodiment.

FIG. 11 shows schematically a block diagram of the fourth example of the enhanced luminaire module 120 according to an embodiment.

In the fourth example, the current limiter 132 incorporates an over-voltage detection. To achieve this, the luminaire module 120 comprises a voltage sensing element or function 136 internal or external to the current limiter 132, which is configured to sense the average or root mean square (rms) voltage over the current limiter 132 and when the voltage exceeds a predetermined threshold voltage (determined e.g. by the maximum power that the current limiter 132 can dissipate in a given application condition), the current limier 132 will short itself via a bypass switch 134 to avoid overtemperature damage.

The switch 133 of the second example and the bypass switch 134 of the third and fourth examples may be implemented by a semiconductor switch (e.g. transistor, thyristor or triac) with a low on-resistance.

Figure 12:
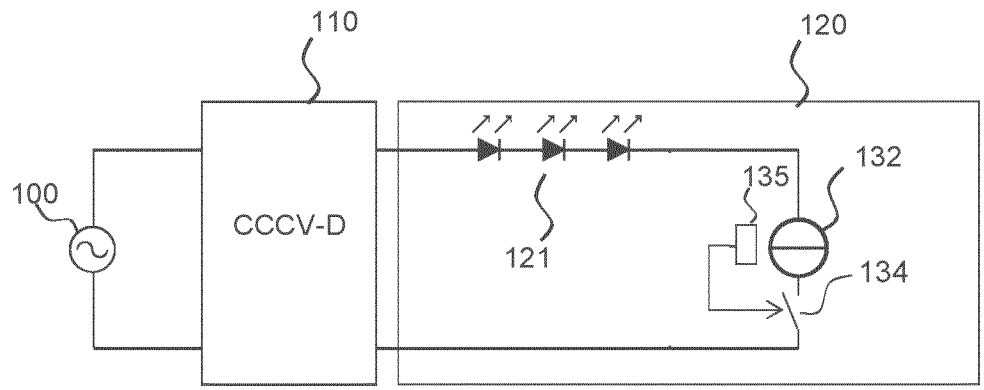
FIG. 12 shows schematically a block diagram of a fifth example of an enhanced luminaire module according to an embodiment.

FIG. 12 shows schematically a block diagram of the fifth example of the enhanced luminaire module 120 according to an embodiment.

In the fifth example, the switch 134 is connected in series with the current limiter 132 so as to cut the current through the current limiter 132 when the temperature sensing element 135 detects that the temperature of the current limiter 132 exceeds the predetermined overtemperature (like a thermostat switch or a resetting over temperature protector). I.e., the overheat protection function of the fifth example switches the current limiter 132 off until it is cooled down. This will also lead to a blinking of the light as well as a regular change in driver current voltage which can be diagnosed in in a first case by an installer and/or in a second case by diagnostic features in the driver 110.

In a modification of the fifth example, the series switch 134 may not be used. Instead, the current limiter 132 may be configured to change the limit current to a lower value where the power losses in the current limiter 132 are lower.

In the fifth example, the temperature sensing element 135 may also be integrated in the same housing as the current limiter 132 making it more practical.

The temperature sensing element 135 of the second, third and fifth example may be a negative temperature coefficient (NTC) thermistor, a resistance temperature detector (RTD, also known as a resistance thermometer), a thermocouple (e.g. two wires of different metals connected at two points), a semiconductor-based sensor (e.g. two identical diodes with temperature-sensitive voltage vs current characteristics that can be used to monitor changes in temperature) or another temperature-sensitive element or circuit.

In a further embodiment, the driver 110 can be configured to detect whether it is connected to a new luminaire module 120 that requires a higher current than the currently programmed output current of the driver 110. For this purpose, the current control circuit 31 of the driver 110 may be configured to control the driver circuit 31 to generate a pulsed output current, wherein a maximum value of the pulsed output current may be equal to or larger than the maximum current value Im of the driver output window shown in FIGS. 2 and 3. The driver 110 can then detect (e.g. based on a change of its output voltage) if the current limiter 132 is provided on the luminaire module 120 and limits the current. Pulsing the output current can be done such that the total power provided to the luminaire module 120 does not change.

Furthermore, in case different luminaire modules 120 are connected to the driver 110 in parallel, the driver 110 can determine by the pulsed output current whether non-matching luminaire modules are connected, e.g., a first luminaire module demands a peak current of 350 mA while newly inserted other luminaire boards of higher efficiency are equipped with a current limiter 132 that limits the current to 300 mA. The driver 110 can determine such a presence of non-matching luminaire modules by detecting a pulsed component in the output voltage.

To summarize, an incorporation of a current limiting/regulating circuit on a luminaire board has been described for ensuring that the luminaire board will automatically operate at its desired current after a replacement. Since the current control at the luminaire board causes an initial mismatch between the current supply of the driver and the demand of the luminaire board, the driver output voltage will drift towards the maximum output voltage of the driver. When the maximum output voltage is reached, the driver is configured to operate in constant-voltage (CV) mode, sense the output current and reduce its output current to the same value as consumed by current-controlled luminaire board. Alternatively, the driver may gradually reduce the setpoint of the output current until it just leaves the CV mode and stay at that setpoint. In this way, the driver will automatically operate at the correct current of a newly installed luminaire board without any action from the user.

While the invention has been illustrated and described in detail in the drawings and foregoing description, such illustration and description are to be considered illustrative or exemplary and not restrictive. The invention is not limited to the disclosed embodiments. The proposed current limiter at the luminaire module and current control at the driver can be applied to and possibly standardized in any types of modules provided in luminaire devices that are driven by a driver.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

The described procedures like those indicated in FIGS. 5 and 6 can be implemented as program code means of a computer program and/or as dedicated hardware of the receiver devices or transceiver devices, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A constant current driver comprising an apparatus for controlling the constant current driver, the apparatus being configured to measure an output voltage of the constant current driver applied to a luminaire module, to determine whether the measured output voltage exceeds an operating range of a current control mode of the constant current driver, and to reduce the output current of the constant current driver if the measured output voltage exceeds the operating range, wherein the apparatus is configured to reduce the output current to the same value as consumed by the luminaire module if the measured output voltage exceeds the operating range, and wherein the apparatus is configured to control the constant current driver to generate a pulsed output current, wherein a maximum value of the pulsed output current is equal to or larger than the operating range of the current control mode, and to determine a presence of a non-matching luminaire module if the output voltage of the constant current driver comprises a pulsed component.

2. The constant current driver of claim 1, wherein the apparatus is configured to gradually reduce a setpoint of the output current until the constant current driver returns to the operating range of the current control mode if the measured output voltage exceeds the operating range.

3. The constant current driver of claim 1, wherein the constant current driver is configured to output a constant current during the current control mode and to switch to a voltage controlled mode where the driver outputs a constant voltage when the output voltage exceeds the operating range of the current control mode.

4. A luminaire module comprising:
at least one light source; and
a current limiter for controlling a current flowing through the at least one light source to a predetermined value,
wherein the luminaire module is configured to be connected to a constant current driver, wherein the current limiter is configured to control the current flowing through the at least one light source to a set target value of the luminaire module independent from the constant current driver,
wherein the luminaire module comprises one of:
a temperature sensing element or functionality for measuring a temperature of the current limiter, and wherein the luminaire module is configured to activate a switch that shunts the output of the constant current driver or bypasses the current limiter if a predetermined overtemperature is measured by the temperature sensing element or functionality;
a temperature sensing element or functionality for measuring a temperature of the current limiter, and wherein the current limiter is configured to increase a setpoint for the current regulation or bypass a current sensing element if a predetermined overtemperature is measured by the temperature sensing element or functionality; or
a voltage sensing element or functionality for measuring a voltage across the current limiter, and wherein the luminaire module is configured to activate a switch to bypass the current limiter when the measured voltage exceeds a predetermined threshold voltage.

5. The luminaire module of claim 4, wherein the current limiter comprises a linear current regulating circuit or a current regulating diode.

6. A lighting system comprising:
the constant current driver; and
the luminaire module of claim 4.

7. A method of controlling a constant current driver in a lighting system, the method comprising:
measuring an output voltage of the constant current driver applied to a connected luminaire module;
determining whether the measured output voltage exceeds an operating range of a current control mode of the constant current driver;
reducing the output current of the constant current driver if the measured output voltage exceeds the operating range;
measuring the output current of the constant current driver;
reducing the output current to the same value as consumed by the luminaire module if the measured output voltage exceeds the operating range;
controlling the constant current driver to generate a pulsed output current, wherein a maximum value of the pulsed output current is equal to or larger than the operating range of the current control mode; and
determining a presence of a non-matching luminaire module if the output voltage of the constant current driver comprises a pulsed component.

8. A non-transitory computer readable medium comprising instructions, the instructions when executed by a processor of a computing device cause the computing device to perform the method of claim 7.

* * * * *